United States Patent [19]

Zijp

[11] 4,386,182

[45] May 31, 1983

[54] THERMOPLASTIC ELASTOMERIC COMPOSITION CONTAINING VULCANIZED RUBBER PARTICLES AND SURFACTANT AND PROCESS FOR PREPARATION THEREOF

[75] Inventor: Jan W. H. Zijp, Geleen, Netherlands

[73] Assignee: Vredestein Icopro B.V., Velp, Netherlands

[21] Appl. No.: 171,040

[22] Filed: Jul. 22, 1980

[30] Foreign Application Priority Data

Jul. 24, 1979 [NL] Netherlands ........................ 7905700

[51] Int. Cl.$^3$ .......................... C08L 7/00; C08L 9/06; C08L 9/00; C08L 23/06
[52] U.S. Cl. ...................................... 524/375; 521/41; 521/44; 524/376; 524/378; 524/528; 525/232
[58] Field of Search .................. 260/2.3, 4 R, 33.2 R, 260/5; 525/232; 521/44, 41; 524/376, 378, 503, 375

[56] References Cited

U.S. PATENT DOCUMENTS

| | | | |
|---|---|---|---|
| 2,912,388 | 11/1959 | Leahy et al. | 260/33.2 R |
| 2,958,671 | 11/1960 | Keskkula et al. | 260/33.2 R |
| 3,404,108 | 10/1968 | Regenstein et al. | 525/232 |
| 3,489,710 | 1/1970 | Bonotto et al. | 260/2.3 |
| 3,836,695 | 9/1974 | Strecker et al. | 524/376 |
| 4,130,534 | 12/1978 | Coran et al. | 525/240 |

OTHER PUBLICATIONS

Martin, Robert W., *The Chemistry of Phenolic Resins*, John Wiley & Sons Inc. (1965), p. 4.

*Primary Examiner*—Wilbert J. Briggs, Sr.

[57] ABSTRACT

Thermoplastic elastomeric compositions are prepared by mixing comminuted vulcanized rubber having a mean particle size of below 1.5 mm with a thermoplastic olefin or diolefin polymer, particular polyethylene, at a weight ratio of from 1:3 to 3:1, and with a non-ionic surfactant in an amount of 0.1 to 5 wt. % referring to the total amount of polymers. The addition of a non-ionic surfactant greatly improves the bonding between the two main components, thus yielding compositions of a very low level of porosity and improved mechanical properties, particularly superior thoughness.

The compositions can be moulded or extruded to a variety of products, such as profiles, roofings, fencing posts, pallets, and also shoe sales, saddle covers, solid tires, sprinkling funnels, etc.

13 Claims, No Drawings

THERMOPLASTIC ELASTOMERIC COMPOSITION CONTAINING VULCANIZED RUBBER PARTICLES AND SURFACTANT AND PROCESS FOR PREPARATION THEREOF

This invention relates to a thermoplastic elastomeric composition obtained by mixing a powdered vulcanized rubber, a thermoplastic polymer and an additive.

To a growing degree, society is confronted with the desirability of recovering waste products and converting them to a form suitable for reuse. The major reasons for this are the increasingly heavy burden on the natural environment and the decreasing availability of raw materials.

A particularly relevant example is the situation concerning waste vulcanized rubber products, in particular used pneumatic tires, which are generated in great quantities and cannot, in general, be rendered suitable for reuse without fairly intensive preliminary treatment. For this reason, methods have long been sought in all quarters to utilize these waste products in such a way that an optimum is obtained between as low as possible processing costs on the one hand and a technical application of the highest possible quality on the other hand.

A very suitable application or use for vulcanized rubber from waste products is as a filler in polymer products, particularly thermoplastic polymer products, whereby the cost price of the plastic product is reduced and a modified property configuration thereof can be obtained. For this purpose, little more has, apparently, to be done than reduce the vulcanized rubber to a comminuted state, e.g., by cutting or grinding such that it can be mixed with or incorporated into the thermoplastic polymer.

However, a crucial problem in preparing mixtures based on a vulcanized rubber and a thermoplastic polymer is the bonding between the two components. If there is insufficient bonding between the rubber particles and the polymer phase, porosity and/or other poor mechanical properties result in the composite product, which is for many applications and uses very undesirable. Thus, the apparent simplicity of the idea is, in practice, misleading.

In U.S. Pat. No. 4,028,288, a method is described for controlling the porosity of mixtures of (comparatively coarse) vulcanized rubber particles and a thermoplastic polymer by varying the relative quantity of rubber and the dimensions of the rubber particles. A disadvantage of this method is, however, that very low degrees of porosities cannot thereby be achieved at the more useful, somewhat higher, rubber contents. Thus, the properties of such mixtures will not have much range of variation and these mixtures will be unsuitable for a large number of applications.

The existence of the problem of proper bonding between vulcanized rubber particles and thermoplastic phase is also admitted in German Offenlegungsschrift No. 2408690, in which the preparation of a thermoplastic material is described, based on rubber particles and a minor quantity, viz., less than 40 wt. %, preferably less than 30 wt. %, of a "selected" thermoplastic polymer as a binder. For this purpose, the two components are chosen such that they differ, in terms of a solubility parameter, by less than 1, and preferably less than 0.5 units, from one another. A disadvantage of this method is that in many cases the said solubility parameter must be determined for each individual batch of the respective vulcanized rubber and thermoplastic polymer components and a restriction must be accepted as regards the range of possibilities for combining the two basic constituents. As will be shown in a comparative example below, products with inferior properties are obtained by the method according to the method of this just-mentioned Offenlegungsschrift.

In Netherlands Patent Specification No. 7806735, a method is revealed for the preparation of products from recycled rubber and a thermoplastic or elastomeric polymer. This method is characterized by supplying an additive consisting of 0.1 to 10 wt. % of a plasticizing agent and/or lubricant and 0.1 to 10 wt. % of a curing agent, both calculated relative to the total mixture. As a plasticizing and/or lubricating agent (waste) oil is specifically mentioned. A major advantage of this method is found to be its potential for regulating the porosity of the final products; in particular, the manufacture is desired of porous drainage tubing using a mixture of 70 to 75 parts by wt. of rubber powder and 30 to 25 parts by wt. of polyethylene, in addition to 1 part by wt. of lubricant plus sulphur.

However, the vulcanization of the resulting mixtures, which is inherent to that method, renders the method more costly and more critical in its actual use.

It has now been found to be possible to prepare a thermoplastic elastomeric composition from a vulcanized rubber and a thermoplastic polymer, which composition possesses at the same time a very low level of porosity and improved mechanical characteristics, in particular superior toughness.

The thermoplastic elastomeric composition according to this invention is composed of comminuted vulcanized rubber, thermoplastic polymer and an additive and is now characterized in that the comminuted vulcanized rubber has a mean particle size of below 1.5 mm and a thermoplastic olefin or diolefin polymer is used, with the weight ratio of rubber and thermoplastic polymer being from about 1:3 to about 3:1, and together with from 0.1 to 5 wt. %, calculated relative to the total quantity of the other components, of a non-ionic surfactant.

Economically, the vulcanized rubber used will be waste or recovered rubber, but it will be understood, of course, that the method may equally well use new or virgin vulcanized rubber albeit at a higher raw materials cost factor. The rubber may be either synthetic or natural.

The non-ionic surfactant is added in a quantity of about 0.1 to 5 parts by weight. In lower quantities, it is insufficiently active in the mixture, while at more than about 5 parts by wt. per 100 parts by weight of the other components the sensitivity to water of the material product obtained rises sharply, which tends to render it less suitable for exterior applications and uses. The best results are obtained with quantities of from about 0.5 to 2.5 wt. % of the non-ionic surfactant component.

Very suitable non-ionic surfactants are the reaction products of a hydroxyl compound with one or more units of a lower alkene oxide, in particular ethylene oxide and/or propylene oxide, with from 1 to 500 alkene oxide units being present in the surfactant molecule, more preferably from 10 to 100 units. Suitable hydroxyl compounds for use as alcohols in such surfactants include, for example, aliphatic alcohols with preferably from 4 to 18 carbon atoms per molecule, and phenols or other compounds containing hydroxyl groups such as fatty acids or partially hydrolyzed oils and fats. The phenols represent an important group herein, preferably the mono- or polyalkyl-substituted phenols, with the alkyl side groups therein preferably containing from 1 to 12 carbon atoms per group.

Examples of especially suitable non-ionic surfactants are the reaction products of octyl or nonyl phenol and ethylene oxide. Other suitable non-ionic surfactants are the block copolymers of ethylene oxide and propylene oxide with terminal OH groups, preferably those containing from 60 to 90 wt. % ethylene oxide. A third group of suitable compounds are the polar vinyl polymers, e.g., polyvinyl pyridine, polyvinyl pyrrolidone, polyvinyl alcohol and cellulose derivatives, e.g., carboxymethylcellulose (CMC).

The comminuted rubber preferably has a mean particle size of between 90 $\mu$m and 1200 $\mu$m and more particularly a median value of between about 300 $\mu$m and 800 $\mu$m. The rubber may, for instance, be reclaimed from pneumatic tires, in particular from tires of passenger cars, and can be reduced to the above dimensions by grinding, preferably cryogenically. For some applications, it is advisable to use the tread component material of the tires, as this contains relatively little fiber or cord content. The rubber particles are preferably freed of ferrous constituents and moisture. Moisture present in the particulate rubber increases the porosity of the products formed and has, moreover, an adverse effect on their appearance. The comminuted rubber can be dried by treating with hot air for several hours, for example, at a temperature of about 50° to 150° C. for 1 to 2 hours. A particular advantage of the invention is that the use of a non-ionic surfactant during the mixing of the components renders it easier to remove any moisture still remaining.

The thermoplastic olefin or diolefin polymer can be constituted of lower alkene or alkadiene monomers, i.e., ethylene, propylene, butylene, butadiene or isoprene or of a mixture of these, or it may be a copolymer of ethylene, propylene, butylene, optionally hydrogenated butadiene or isoprene with less than 50 wt. % of one or more other polymers. These thermoplastic polymers are also very suitably used in the form of waste material, such as may be recovered in their normal processing.

In the composition according to the invention, the powdered vulcanized rubber and the thermoplastic polymer are present in a weight ratio of from about 1:3 to about 3:1 by weight. At lower weight ratios insufficient economic benefit can be attained and too rigid a material is obtained for many applications. A higher ratio by weight reduces the tensile strength of the composition excessively in relation to the tensile strength of the pure thermoplastic polymer.

If a non-ionic surfactant is used, it is now found that the toughness of the composition increases with an increasing quantity of rubber particles, in contrast with the result obtained with or through use of either cationic or anionic surfactants. The preferred composition according to this invention contains the comminuted vulcanized rubber having a mean particle size of below 1.5 mm mixed with the thermoplastic olefin or diolefin polymer, in a weight ratio of from about 1:2 to 2:1, more specifically of from about 2:3 to 3:2.

The thermoplastic compositions according to the invention can be prepared by mixing the particulate vulcanized (waste) rubber, the thermoplastic polymer and the non-ionic surfactant under shearing forces in a conventional mixing device, e.g., in a Banbury kneader mixer or on the rolls, until a homogeneous mixture is obtained. This is preferably carried out at a temperature above the processing temperature or melting point of the thermoplastic polymer, for example at a temperature of from 100° C. to 250° C., in particular from 130° C. to 200° C. It is strongly recommended not to choose too high a temperature, because at higher temperatures a pronounced generation of odor and gas may appear. Moreover, the products from compositions thus obtained will often give off an obnoxious smell for a long time after molding.

It is also possible to mix the comminuted rubber and the thermoplastic polymer by the method described above, with the non-ionic surfactant being added subsequently, to the mass, preferably in a molten form. The whole mass is then blended, without kneading, for some time, for instance 5 to 50 min., in a rolling drum or paddle mixer. Provided the thermoplastic polymer is present in an appropriate form, for example, in particle form, simple mixing without kneading all components may be sufficient for some purposes.

A variety of additional additives can be incorporated in the thermoplastic elastomeric composition according to this invention, e.g., regenerated rubber, lubricants, carbon black, oil, anti-oxidants, stabilizers, flame retardants, etc. Surprisingly, it has particularly been found that the resulting composition is readily colorable, for instance, by the addition of pigments, despite the considerable quantity of carbon black generally present in the particulated rubber employed.

The resulting thermoplastic elastomeric composition can be molded by extrusion or injection moulding, or by other methods, into a variety of products with a wide range of applications. Possible uses include extruded sealing profiles, roofing, floor coverings for sheds, fencing posts, sleepers, pallets, etc., as well as shoe soles, saddle covers, anti skid supports for ladders, mud flaps, solid tires, sprinkling funnels etc.

The invention will be further understood by reference to the following examples, and comparative examples, which are, however, illustrative only and non-limiting as to the scope of practice of the invention.

EXAMPLES I–III

In a heated Banbury mixer homogeneous mixtures were prepared from high-density polyethylene (STAMYLAN 8409) and comminuted rubber by kneading for 5 minutes at a temperature varying from 100° C. to 175° C. The rubber particles were obtained by grinding passenger-car tires and consisted substantially of SBR, butadiene rubber and a minor quantity of natural rubber. The particle size was between 90 $\mu$m and 1200 $\mu$m, with a median value of 500 $\mu$m. The powder was dried for two hours at 80° C. after grinding and then rendered free of iron with the aid of a magnet. Immediately after mixing in the Banbury mixer, a non-ionic surfactant of the polyethyleneoxide type (CARBOWAX 4000) in the molten state was added to the hot mixtures. The whole mass was subsequently mixed in a drum for 15 min.

Test specimens measuring 50×100 mm and 2 mm thickness were then molded from the compositions thus obtained in an injection-molding machine, at a polymer temperature of about 170° C., and a mold temperature of 50° C. Cycle time was approx. 25 sec.

The composition (in parts by weight) and the mechanical characteristics, combined with those of the compounds as per Comparative Examples A-K, are given in the Table below.

The compositions could also be processed very well on an extruder. A good quality tubing could thus be obtained.

Comparative Examples A–K

By the same procedure as in Examples I–III, compositions were prepared in which CARBOWAX 4000 was replaced by an anionic (STRUKTOL W 33) or a cationic (ARQUAD 18) surfactant or without addition of any surfactant.

To determine the mechanical characteristics, the test specimens, which were notched 5 mm on both longitudinal sides, were tensioned in a tensile strength tester and extended to max. 45% of their original length. During the whole test, the tensile force applied was measured as a function of the elongation.

The notch energy is defined by:

$$\frac{\text{force} \times \text{elongation (integrated over the whole elongation)}}{\text{net original cross-sectional area of the test}}$$

and expressed in $KJ/m^2$

The specific strain is defined by:

$$\frac{\text{notch energy} \times \text{original length of the test specimen}}{\text{maximum force occurring during elongation to 45\%}} \times 100\%$$

and expressed in %.

In the following Tables the results are tabulated:

| COMPARISON OF NOTCH ENERGY: $kJ/m^2$ (100% Polyethylene = 391) | | | |
|---|---|---|---|
| Composition By Wt. Ratio Polyethylene:Rubber | 65/35 (Example) | 50/50 (Example) | 35/65 (Example) |
| Non-Ionic Surfactant* | 160 (I) | 145 (II) | 95 (III) |
| Anionic Surfactant* | 145 (A) | 110 (B) | 70 (C) |
| Cationic Surfactant* | 115 (D) | 75 (E) | 65 (F) |
| Zero Surfactant | 54 (G) | 76 (H) | 62 (K) |

*One part by weight, each instance.

| COMPARISON OF SPECIFIC STRAIN, PERCENT (100% Polyethylene = 38.3%) | | | |
|---|---|---|---|
| Composition By Wt. Ratio Polyethylene:Rubber | 65:35 (Example) | 50:50 (Example) | 35:65 (Example) |
| Non-Ionic Surfactant* | 22 (I) | 31 (II) | 34.5 (III) |
| Anionic Surfactant* | 18.5 (A) | 16.8 (B) | 16 (C) |
| Cationic Surfactant* | 14.5 (D) | 14.5 (E) | 16 (F) |
| Zero Surfactant | 13 (G) | 16 (H) | 20 (K) |

*One part by weight, each instance.

The tabulated results show that the toughness as represented by the specific strain values is very much improved by the addition of just 1% non-ionic surfactants in contrast to the results with cationic, anionic, or no surfactant. Moreover, at the same time the notch energy, too, is considerably improved in this way.

By a visual evaluation of the test specimens, a sharp decrease in the degree of porosity can be observed, if 1% non-ionic surfactant is added, than can be observed if either of the other two surfactants are added.

EXAMPLE IV

By the same procedure as in Examples I–III, compositions were prepared using thermoplastic elastomers on a polyolefin basis as well as based on block copolymers of butadiene and styrene (KELTAN TP 0300, KELTAN TP 0500 and CARIFLEX 4113, respectively), with particulate rubber contents of 50 to 70 wt. %.

Here, too, a sharply decreased porosity was observed if only 1% non-ionic surfactant was added.

EXAMPLE V

Mixtures having the same composition as in Example IV were prepared, but now by mixing on heated rollers (temp. 140°–160° C.) instead of in a Banbury mixer. Very much improved rolling behavior was here observed when 1 wt. % non-ionic surfactant was added. A coherent rolled sheet was more rapidly formed.

COMPARATIVE EXAMPLE L

A mixture of high-density polyethylene and undried rubber powder in a 1:1 weight ratio was prepared in a Banbury mixer and then molded to test specimens in accordance with example 1 of German Offenlegungsschrift No. 2408690. It was found that this mixture gave off a considerable odor during processing and caused a white deposit on the mold wall during injection molding. The surface of the specimens was patchy.

COMPARATIVE EXAMPLE M

A mixture of polyvinyl chloride (PVC) and dried rubber powder in a 1:1 weight ratio was prepared in a Banbury mixer. It was found to be impossible to extrude this mixture to form coherent tubing even at temperatures up to 200° C. The melt was too incoherent for this purpose. The rubber particles were not well enclosed by the PVC, causing the surface to remain rough (the composition resembled coarse sandpaper). The resulting pieces of tubing possessed virtually no mechanical strength.

EXAMPLES VI–VII

By the same procedure as in Examples I–III compositions were prepared, however with 0.3% wt. Carbowax 4000. The rubber particles were made from thread component material of tires and contained little fiber and cord content. Articles with reduced porosity could be molded by injection molding which were acceptable for certain applications such as mud flaps.

If these mixtures were prepared with 4.5 wt. % Carbowax 4000 no porosity could be observed. However the surface was greasy and the yield on extruding was significantly lower.

What is claimed is:

1. A non-aqueous thermoplastic elastomeric composition of (i) a comminuted vulcanized rubber having a mean particle size of below 1.5 mm, wherein said rubber is selected from the group consisting of butadiene rubber, isoprene rubber and SBR, (ii) a thermoplastic olefin or diolefin polymer constituted of lower alkene or alkadiene monomers, wherein the weight ratio of rubber to thermoplastic polymer is from 1:3 to 3:1, and (iii) a non-ionic surfactant which is the reaction product of a hydroxyl compound with an alkene oxide, and which is present in an amount of from 0.1 to 5 wt. %, calculated relative to the total quantity of the other components.

2. A thermoplastic elastomeric composition according to claim 1, wherein non-ionic surfactant is present in an amount from 0.5 to 2.5 wt. %, calculated relative to the total quantity of the other components.

3. A thermoplastic elastomeric composition according to either claim 1 or 2, wherein said non-ionic surfactant is the reaction product of a hydroxyl compound with 1–500 units of an alkene oxide.

4. A thermoplastic elastomeric composition according to either claim 1 or 2, wherein said non-ionic surfactant is the reaction product of a phenol with one or more alkyl groups having 1 to 12 carbon atoms and 1-500 ethylene oxide units.

5. A thermoplastic elastomeric composition according to either of claim 1 or 2, wherein the weight ratio of rubber and thermoplastic polymer is from about 1:2 to about 2:1.

6. A thermoplastic elastomeric composition according to either claim 1 or 2, wherein the weight ratio of rubber to thermoplastic polymer is from about 2:3 to about 3:2.

7. Thermoplastic elastomeric composition according to either claim 1 or 2, wherein said comminuted vulcanized rubber is obtained by grinding pneumatic tires, with subsequent removal of ferrous constituents and drying.

8. A thermoplastic elastomeric composition according to either claim 1 or 2, wherein said thermoplastic olefin or diolefin polymer is a polymer of ethylene, propylene, butylene, butadiene, isoprene, or mixtures of these, or a copolymer of ethylene, propylene, butylene, including hydrogenated butadiene or isoprene with less than 50 wt. % of one or more other olefin monomer.

9. A thermoplastic elastomeric composition according to either claim 1 or 2, wherein said thermoplastic polymer is polyethylene.

10. A process for the manufacture of a thermoplastic elastomeric composition which consists essentially in comminuting vulcanized rubber, wherein said rubber is selected from the group consisting of butadiene rubber, isoprene rubber, and SBR, to a mean particle size of at most about 1.5 mm, and intermixing the same with (a) a thermoplastic olefin or diolefin polymer constituted of lower alkene or alkadiene monomers at a weight ratio of rubber to thermoplastic polymer of from about 1:3 to 3:1, and with a non-ionic surfactant which is the reaction product of a hydroxyl compound with an alkene oxide, added to the mixture in an amount from 0:1 to 5 wt. % calculated relatively to the total quantity of said other components, the mixing together of all three of said components being conducted at a temperature of at most about 250° C.

11. A process according to claim 10, wherein said mixing is at a temperature of below 200° C.

12. The composition of claims 1 or 2 substantially free from moisture by drying.

13. The process of claims 10 or 11 wherein the composition is substantially freed from moisture by drying.

* * * * *